United States Patent [19]

Ueda

[11] Patent Number: 5,370,405
[45] Date of Patent: Dec. 6, 1994

[54] PACKING

[75] Inventor: Takahisa Ueda, Sanda, Japan

[73] Assignee: Nippon Pillar Packing Co., Ltd., Osaka, Japan

[21] Appl. No.: 164,782

[22] Filed: Dec. 10, 1993

Related U.S. Application Data

[63] Continuation of Ser. No. 761,362, Aug. 30, 1991, abandoned.

[51] Int. Cl.⁵ .............................................. F16J 15/12
[52] U.S. Cl. .................................... 277/230; 277/227
[58] Field of Search .................... 277/229, 230, 235 R, 277/DIG. 6, 227; 87/1, 3, 5, 7

[56] References Cited

U.S. PATENT DOCUMENTS

| | | | |
|---|---|---|---|
| 3,108 | 9/1868 | Bates | 277/229 X |
| 903,188 | 11/1908 | Hogut | 277/229 X |
| 2,157,867 | 5/1939 | Robertson et al. | 277/230 X |
| 2,360,106 | 10/1944 | Buhler | 277/230 X |
| 2,562,262 | 7/1951 | De Witt, Sr. | 277/235 R X |
| 2,882,082 | 4/1959 | Poltorak et al. | 277/230 X |
| 2,924,471 | 2/1960 | Poltorak et al. | 277/230 X |
| 3,404,061 | 10/1968 | Shane et al. | 277/DIG. 6 |
| 3,481,824 | 12/1969 | Poltorak | 277/230 X |
| 3,646,846 | 3/1972 | Houghton et al. | 277/230 X |
| 4,190,257 | 2/1980 | Schnitzler | 277/102 |
| 4,298,207 | 11/1981 | Hopper et al. | 277/230 |
| 4,333,380 | 6/1982 | Kozlowski | 277/230 X |
| 4,455,334 | 6/1984 | Ogino et al. | 277/230 X |
| 4,548,265 | 10/1985 | Luke | 277/123 X |
| 4,559,862 | 12/1985 | Case et al. | 277/230 X |
| 4,667,969 | 5/1987 | Suggs, III | 277/230 |
| 4,705,722 | 11/1987 | Ueda et al. | 277/230 X |
| 4,826,181 | 5/1989 | Howard | 277/112 |
| 5,082,296 | 7/1992 | Ashizawa et al. | 277/230 X |
| 5,134,030 | 7/1992 | Ueda et al. | 277/230 |
| 5,240,769 | 8/1993 | Ueda et al. | 277/230 X |

FOREIGN PATENT DOCUMENTS

| | | |
|---|---|---|
| 63-308275 | 12/1988 | Japan . |
| 64-26069 | 1/1989 | Japan . |
| 13975 | of 1885 | United Kingdom ............... 277/230 |
| 2116695 | 9/1983 | United Kingdom ............... 277/230 |

OTHER PUBLICATIONS

U.S. Packing Catalog #8954; pp. 42, 45, and 46; Nov. 15, 1938.
Machine Design; Seals 3rd ed.; pp. 39–44; Mar. 13, 1967.

Primary Examiner—Daniel G. DePumpo
Attorney, Agent, or Firm—Jones, Tullar & Cooper

[57] ABSTRACT

A packing for hermetically sealing a member. The packing in accordance with the present invention comprises braiding yarns each of which includes a plurality of longitudinally arranged reinforcing fiber yarns and expanded graphite integrally bonded to at least one side of the reinforcing fiber yarns with adhesives, so that the braiding yarns are provided with excellent sealing properties and strong tensile strength and toughness. A plurality of such braiding yarns may be put together to form a core member. The core member may be covered, at the outer periphery thereof, with a braided body of the braiding yarns. A plurality of such braiding yarns as put together may be braided (square-knitted). Alternatively, a plurality of such braiding yarns (4) as put together may be twisted. Thus, packing having a free length may be obtained. The packing thus obtained may be used as cut, at a site, to a predetermined length according to the size of the object member to be sealed. This eliminates production, based on estimations in advance, of a variety of annular packings according to the sizes of object members to be sealed, as done in molded packing.

4 Claims, 3 Drawing Sheets

PACKING

This is a continuation of co-pending application Ser. No. 07/761,362 filed on Aug. 30, 1991 now abandoned.

FIELD OF THE INVENTION

The present invention relates to packing suitably used as gland packing to be used at a shaft sealing portion in a fluid apparatus.

BACKGROUND OF THE INVENTION

As the material of a gland packing used at, for example, a shaft sealing portion in a fluid apparatus or the like there is known a packing using, as its base material expanded graphite which is excellent in compression-restoring force and sealing properties.

The gland packing of such material is made by a compression molding method of the laminate type, the die molding type, the tip molding type, the ribbon pack type, or the like. Such gland packing should be previously made in the form of a ring having an inner diameter corresponding to the outer diameter of a shaft to be sealed. Accordingly, the gland packing cannot be used for a shaft of which the out diameter is not fit for the inner diameter of the ring-like packing. Thus, such packing lacks versatility. Further, the expanded graphite itself is poor in tensile strength and therefore fragile. This makes it difficult to take out or replace such gland packing which has been mounted on a stuffing box or the like. Thus, the gland packing presents a problem in view of practical utility.

In addition, the respective types of the compression molding present the following problems.

In the laminate-type, the yield is low, leading to increase in production cost. In the die molding type and the tip molding type, gland packing is molded with the use of molds, causing the production cost to be increased. Further, such gland packing lacks versatility. The ribbon pack type presents poor workability.

The problems mentioned above may be solved by making the expanded graphite in the form of a string or braided packing, so that the string-like expanded graphite may be used as cut into a predetermined length according to the diameter of a shaft to be sealed. However, the expanded graphite itself comprises vermiform particles, each of which is expanded in the direction of the C-axis of the crystal of a graphite particle. These vermiform particles as agglomerated may be compression-molded into a sheet. However, the expanded graphite even made in such a sheet, is poor in tensile strength and there-fore fragile. Accordingly, such a sheet cannot be cut into yarn suitable to make a braided body. It is therefore not possible to apply such expanded graphite to a packing which may be used as cut to a predetermined length according to the diameter of a shaft to be sealed and wound around the outer periphery thereof. The same comments apply to a braided packing.

SUMMARY OF THE INVENTION

In view of the background art mentioned above, an object of the present invention is to provide packing in the form of a string improved in practical utility and versatility. After diligent study of the arrangement of a braiding yarn using expanded graphite, a way has been found to make a braiding yarn of expanded graphite by bonding expanded graphite to a reinforcing fiber yarn with adhesives, so that the synergistic action of the reinforcing fiber yarn and the expanded graphite gives, to the resultant braiding yarn, a great compression-restoring force, excellent sealing properties, and strong tensile strength and toughness. A plurality of such braiding yarns may be put together to form a core member and the core member may be then covered, at the outer periphery thereof, with a braided body of the braiding yarns, thereby to make the assembly in the form of a string. A plurality of such braiding yarns as put together may be braided in the form of a string. A plurality of such braiding yarns as put together may also be twisted in the form of a string.

According to the packing of the present invention, the strong tensile strength and toughness of the reinforcing fiber yarns are given to the braiding yarns. Thus, the braiding yarns may be braided or twisted without the yarns cut. It is therefore possible to form a string-like packing in which the core member made of the braiding yarns is covered, at the outer periphery thereof, with a braided body of the braiding yarn s. Further, the great compression-restoring force and excellent sealing properties of the expanded graphite are given to the core member and the braided body, thus assuring such sealing properties as inevitably required for packing.

Further, a plurality of such braiding yarns provided with strong tensile strength and toughness may be put together and braided. It is therefore possible to form a braided body (as square-knitted) having strong tensile strength and toughness. The great compression-restoring force and excellent sealing properties of the expanded graphite are given to the braided body, thus assuring such sealing properties as inevitably required for packing.

Further, a plurality of such braiding yarns having strong tensile strength and toughness may be put together and twisted. It is therefore possible to form a twisted string-like member having such strong tensile strength and toughness. In addition, the great compression-restoring force and excellent sealing properties of the expanded graphite are given to this string-like member, thus assuring such sealing properties as inevitably required for packing.

DESCRIPTION OF THE PREFERRED EMBODIMENT

Figure 1:
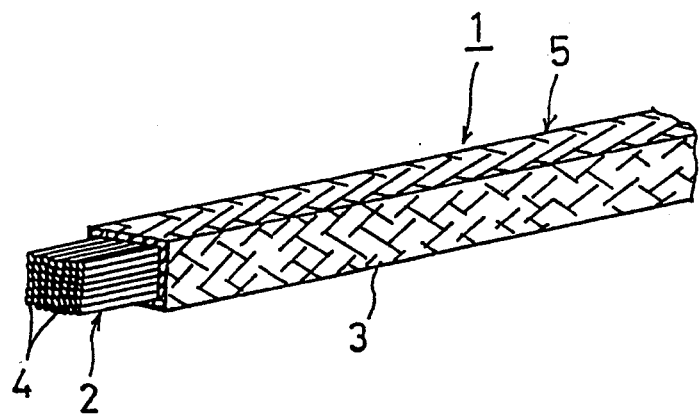
FIG. 1 is a perspective view, with portions broken away, of an embodiment of a packing in accordance with a first variant of the invention.

FIG. 1 is a perspective view, with portions broken away, of an embodiment of a packing in accordance with a first aspect of the invention.

In FIG. 1, packing 1 comprises a core member 2 and a braided body 3 covering the outer periphery of the core member 2, the braided body 3 being made by, for example, circular-braiding. The core member 2 is formed by longitudinally arranging a plurality of braiding yarns 4 as put together. The braided body 3 is formed by circular-braiding the yarns 4.

Figure 2:
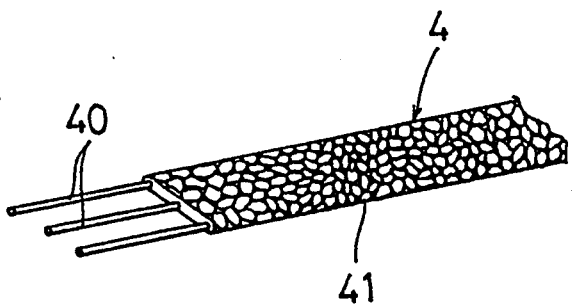
FIG. 2 is a perspective view, with portions broken away, of an example of a braiding yarn.

As shown in FIG. 2, each braiding yarn 4 comprises a plurality of longitudinally arranged reinforcing fiber yarns 40 made of, for example, cotton, and expanded graphite 41 having a vermiform shape integrally bonded to the outer surface of the yarns 40 with adhesives (for example, acrylic ester) (not shown).

The cotton yarns used as the reinforcing fiber yarns 40 have, on the outer surface thereof, an infinite number of extremely short and fine fibers, i.e., so-called fuzz. This improves the adhesion of the adhesives. Accordingly, the reinforcing fiber yarns 40 and the expanded graphite 41 are securely bonded to each other to prevent the expanded graphite 41 from partially falling from the reinforcing fiber yarns 40.

Thus, the braiding yarns 4 are formed by integrally bonding, with adhesives, the expanded graphite 41 to the outer surfaces of a plurality of longitudinally arranged reinforcing fiber yarns 40 made of, for example, cotton. The strong tensile strength and toughness of the reinforcing fiber yarns 40 are given to the braiding yarns 4. Accordingly, the braiding yarns 4 may be braided without the yarns 4 being cut. It is therefore possible to form a string-like member 5 in which the outer periphery of the core member 2 made of the braiding yarns 4 is covered with the braided body 3 as obtained by circular-knitting the braiding yarns 4. This string-like member 5 has characteristics excellent in tensile strength and toughness. Thus, this string-like member 5 may be used, as the packing 1, as cut to a predetermined length according to, for example, the diameter of a shaft to be sealed. This improves the packing 1 in versatility and practical utility. Further, the great compression-restoring force and excellent sealing properties of the expanded graphite 41 are given to the core member 2 and the braided body 3 forming the packing 1. It is therefore assured that the packing 1 is provided with such excellent sealing properties as inevitably required for packing.

Figure 3:
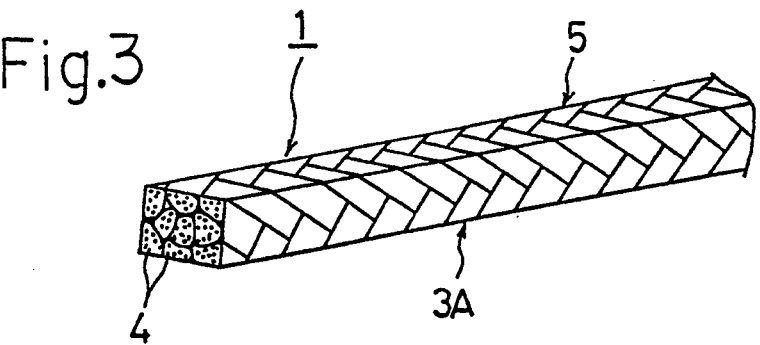
FIG. 3 is a perspective view of an embodiment of packing in accordance with a second variant of the invention.

FIG. 3 is a perspective view of an embodiment of a packing in accordance with a second variant of the invention. In FIG. 3, like parts are designated by like numerals used in FIG. 1 and the detailed description of such like parts is here omitted.

In FIG. 3, the packing 1 is made in the form of a string-like member 5 made of a braided body 3A as obtained by square-braiding eight braiding yarns 4.

The strong tensile strength and toughness of the reinforcing fiber yarns 40 are given to the braiding yarns 4. Accordingly, the braiding yarns 4 may be braided (as square-knitted) without the yarns 4 cut. Thus, the string-like member 5 may be made of the braided body 3A having characteristics excellent in tensile strength and toughness. It is therefore possible to use, as the packing 1, this string-like member 5 as cut to a predetermined length according to, for example, the diameter of a shaft. This improves the packing 1 in versatility and practical utility. Further, the strong compression-restoring force and excellent sealing properties of the expanded graphite 41 are given to the braided body 3A forming the packing 1. Accordingly, the packing 1 may be provided with such sealing properties as indispensably required for packing.

Figure 4:
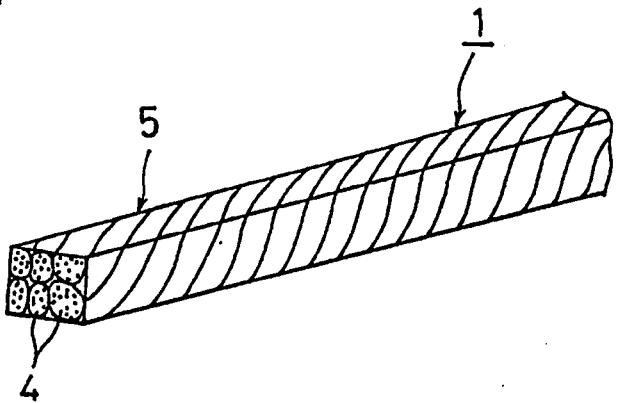
FIG. 4 is a perspective view of an embodiment of packing in accordance with a third variant of the invention.

FIG. 4 is a perspective view of an embodiment of a packing in accordance with a third variant of the invention. In FIG. 4, like parts are designated by like numerals used in FIG. 1 and the detailed description of such like parts is here omitted.

In FIG. 4, the packing 1 is made in the form of a string-like member 5 by roll-molding six braiding yarns 4 formed us described above, while these braiding yarns 4 are being twisted 20 times/m.

The strong tensile strength and toughness of the reinforcing fiber yarns 40 are given to the braiding yarns 4. Accordingly, the braiding yarns 4 may be twisted without the yarns 4 cut. It is therefore possible to form the string-like member 5 having strong tensile strength and toughness. Accordingly, this string-like member 5 may be used, as the packing 1, as cut to a predetermined length according to, for example, the diameter of a shaft to be sealed. This improves the packing 1 in versatility and practical utility. Further, the strong compression-restoring force and excellent sealing properties of the expanded graphite 41 are given to the twisted string-like member 5 forming the packing 1. Accordingly, the packing 1 may be provided with such sealing properties as indispensably required for packing.

In the foregoing, the description has been made of expanded graphite 41 in vermiform shaped particles. Alternately, there may be used expanded graphite sheets each of which is so cut as to have a small width of, for example, 5 mm or less.

Alternately, each braiding yarn 4 may be formed by bonding the expanded graphite 41 only on one side surface of a plurality of reinforcing fiber yarns 40 with adhesives.

Figure 5:
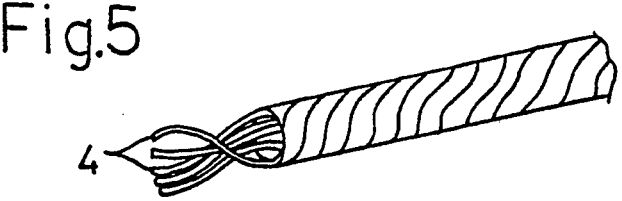
FIG. 5 is a perspective view of another example of the braiding yarn.

Further, the braiding yarns 4 may be used after twisted as shown in FIG. 5.

The reinforcing fiber yarns 40 forming the braiding yarns 4 may be made of, instead of cotton mentioned earlier, a single material which is selected from organic fibers such as rayon fibers, phenol fibers, aramid fibers, PBI (polybenzimidazole) fibers, PTFE (polytetrafluoroethylene) fibers, PPS (polybenylene sulfide) fibers, PEEK (poletheretherketone) fibers and the like which is selected from inorganic fibers such as glass fibers, carbon fibers, ceramic fibers and the like, or which is selected from metallic line members such as line members of stainless steel, Inconel, monel metal and the like.

The inorganic fibers and the metallic line members present no fuzz on the surfaces thereof, and are therefore slightly inferior in adhesion to the adhesives to the organic fibers. However, the proper selection of the adhesives enables the reinforcing fiber yarns 40 and the expanded graphite 41 to be bonded to each other in a relatively secure manner. This prevents the expanded graphite 41 from partially falling from the reinforcing fiber yarns 40. In the braiding yarns 4 made of such inorganic fibers or metallic line members, the tensile strength is considerably improved as compared with the braiding yarns 4 made of the organic fibers.

Figure 6:
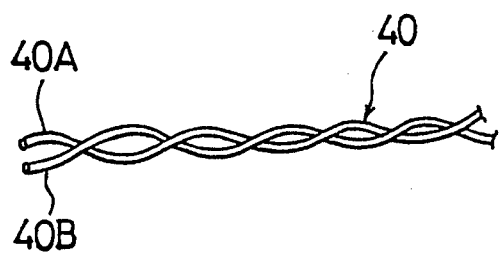
FIGS. 6 to 10 are views of various examples of a reinforcing fiber yarn.

FIGS. 6 to FIG. 10 respectively show modifications of the reinforcing fiber yarn 40. In FIG. 6, the reinforcing fiber yarn 40 is made by twisting a yarn 40A made of a single material selected from the organic fibers mentioned earlier (cotton or aramid), and a yarn 40B made of a single material selected from the inorganic fibers and metallic line members mentioned earlier (glass fibers, carbon fibers or stainless steel line members). This reinforcing fiber yarn 40 may be improved in toughness and adhesion of adhesives by the organic fibers, and also improved in tensile strength and toughness by the inorganic fibers or metallic line members.

Figure 7:
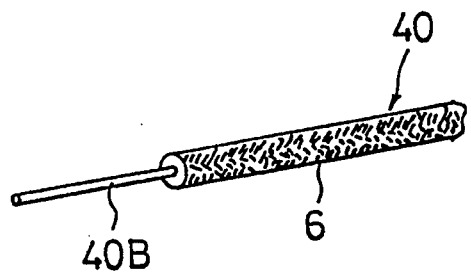

In FIG. 7, the reinforcing fiber yarn 40 comprises (i) a yarn 40B made of at least one material selected from the inorganic fibers and metallic line members mentioned earlier (glass fibers, carbon fibers or stainless steel line members), and (ii) short fibers 6 made of a single material selected from the organic fibers mentioned earlier (cotton or aramid), the short fibers 6 covering the surface of the yarn 40B. This reinforcing fiber yarn 40 may be improved in toughness and adhesion of adhesives by the covering layer of the short fibers 6, and also improved in tensile strength and toughness by the yarn 40B made of at least one material selected from the inorganic fibers and the metallic line members. The short fibers 6 forming the covering layer may be made of a composite short fiber yarn containing, in combination, fibers made of two or more types selected from the organic fibers.

Figure 8:
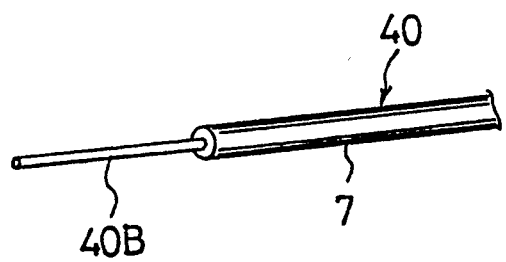

In FIG. 8, the reinforcing fiber yarn 40 comprises a yarn 40B made of at least one material selected from the inorganic fibers and metallic line members mentioned earlier (glass fibers, carbon fibers or stainless steel line members), this yarn 40B being covered with, for example, pulp sheet-form 7. This reinforcing fiber yarn 40 may be improved in toughness and adhesion of adhesives by the covering layer of the pulp sheet-form 7, and also improved in tensile strength and toughness by the yarn 40B made of at least one material selected from the inorganic fibers and the metallic line members.

Figure 9:
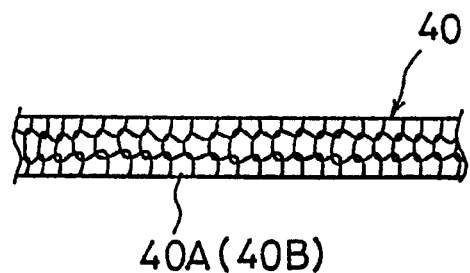

In FIG. 9, the reinforcing fiber yarn 40 is made by knitting either a yarn 40A made of a single material selected from the organic fibers mentioned earlier (cotton or aramid) or a yarn 40B made of a single material selected from the inorganic fibers and metallic line members mentioned earlier (glass fibers, carbon fibers or stainless line members ). This reinforcing fiber yarn 40 may be improved in adhesion of adhesives by the concavo-convex knitted portions in the knit structure thereof. Further, the stretching properties of the knit structure itself may absorb a tensile force. This results in increase in tolerance for stretching, thus improving the toughness.

Figure 10:
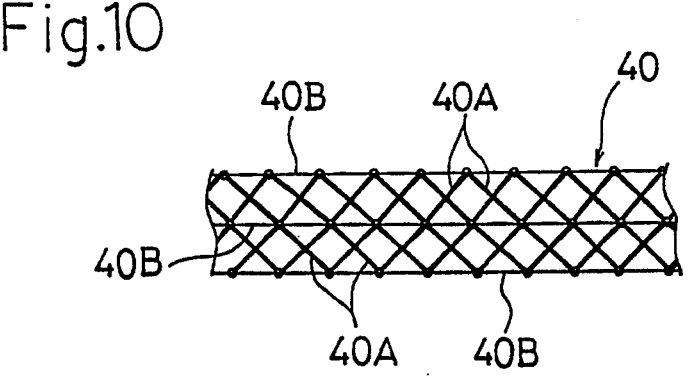

In FIG. 10, the reinforcing fiber yarn 40 comprises (i) a plurality of longitudinally arranged fibers 40B in parallel to one another, made of a single material selected from the inorganic fibers and metallic line members mentioned earlier (glass fibers, carbon fibers or stainless steel line members), and (ii) fibers 40A made of a single material selected from the organic fibers mentioned earlier (cotton or aramid), the fibers 40A being entangled with the fibers 40B so that the fibers 40B are maintained in parallel with one another. This reinforcing fiber yarn 40 may be improved in toughness and adhesion of adhesives by the organic fibers, and also improved in tensile strength and toughness by the inorganic fibers or the metallic line members.

Figure 11A:
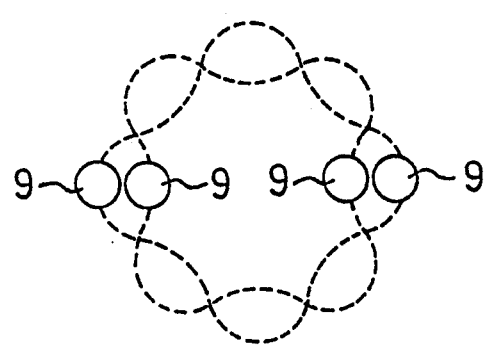
FIGS. 11A, 11B and FIGS. 12A, 12B are views illustrating variations of the distances between braiding yarns fed from bobbins and a knitting point in circular knitting and square knitting, respectively.
Figure 12A:
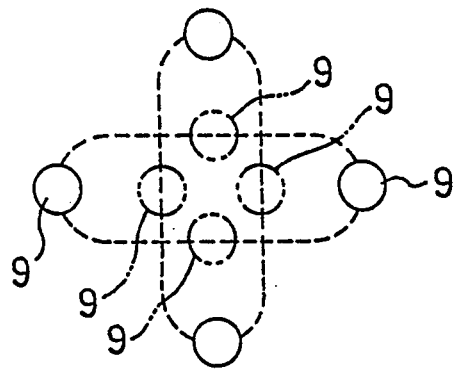
Figure 11B:
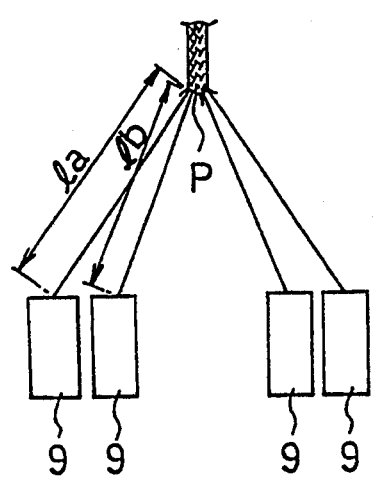
Figure 12B:
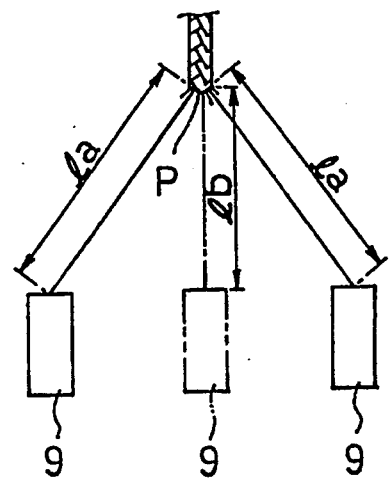

The strong tensile strength and toughness of the reinforcing fiber yarns 40 are given to the braiding yarn 4. Thus, the braiding yarns 4 may be readily braided or twisted without the yarns 4 cut. More specifically, when carrying out circular-braiding while drawing out the braiding yarns 4 from a plurality of bobbins 9 adapted to be moved along loci shown by broken lines as shown in FIGS. 11A and 11B, there is produced a small difference between the distance 1a between a braiding point P and each pf the bobbin 9 as located in the outermost parts of one locus, and the distance 1b between the braiding point P and each of the bobbins 9 as located in the innermost parts of the other locus. In this case, a relatively small tensile force is applied to the braiding yarns 4, so that the yarns 4 may be readily braided. On the other hand, when carrying out square-braiding while drawing out the braiding yarns 4 from a plurality of bobbins 9 adapted to be moved along diagonal loci shown by broken lines as shown in FIGS. 12A and 12B, there is produced a great difference between the distance 1a between a braiding point P and each of the bobbins 9 as located in the outermost parts of one locus, and the distance 1b between the braiding point P and each of the bobbins 9 as located in the center parts of the other locus. In this case, a relatively great tensile force is applied to the braiding yarns 4. Even in this case, the yarns 4 may be braided.

Industrial Applicability

In packing using expanded graphite as a base material, the present invention eliminates a need for provision of a variety of annular packings according to the diameters of shafts to be sealed, as conventionally required for molded packing made of expanded graphite. The packing of the present invention has not only such sealing properties as inevitably required for packing, but also strong tensile strength and toughness. Thus, the packing of the present invention may be suitably used as gland packing or a sealing member for static members.

What is claimed is:

1. Packing comprising braiding yarns,
   each of said braiding yarns including a plurality of longitudinally arranged reinforcing fiber yarns and expanded graphite integrally bonded to said reinforcing fiber yarns with adhesive, and
   a plurality of said braiding yarns being braided together, wherein the reinforcing fiber yarns comprise fiber yarns covered, at their surface, with pulp sheet-form.

2. Packing comprising braiding yarns,
   each of said braiding yarns including a plurality of longitudinally arranged reinforcing fiber yarns and expanded graphite integrally bonded to said reinforcing fiber yarns with adhesive, and
   a plurality of said braiding yarns being braided together, wherein the reinforcing fiber yarns comprise a plurality of longitudinally arranged inorganic fibers in parallel with one another, and organic fibers entangled with said inorganic fibers so that said inorganic fibers are maintained in parallel with one another.

3. Packing comprising braiding yarns,
   each of said braiding yarns including a plurality of longitudinally arranged reinforcing fiber yarns and expanded graphite integrally bonded to said reinforcing fiber yarns with adhesive, and
   a plurality of said braiding yarns being braided together, wherein the reinforcing fiber yarns comprise
   composite fiber yarns made of at least one material selected from the group of inorganic fibers consisting of glass fibers, carbon fibers and ceramic fibers, and the group of metallic line members consisting of stainless steel, Inconel and Monel metal, said composite fiber yarns being covered at the surface thereof with pulp sheet-form.

4. Packing comprising braiding yarns,
each of said braiding yarns including a plurality of longitudinally arranged reinforcing fiber yarns and expanded graphite integrally bonded to said reinforcing fiber yarns with adhesive, and
a plurality of said braiding yarns being braided together, wherein the reinforcing fiber yarns comprise a plurality of longitudinally arranged metallic line members in parallel with one another, and organic fibers entangled with said metallic line members so that said metallic line members are maintained in parallel with one another.

* * * * *